Dec. 24, 1929.  R. H. RANGER  1,740,833
METHOD AND MEANS FOR COMPARING AND SELECTING RADIOSIGNALS
Filed Feb. 16, 1923  2 Sheets-Sheet 2
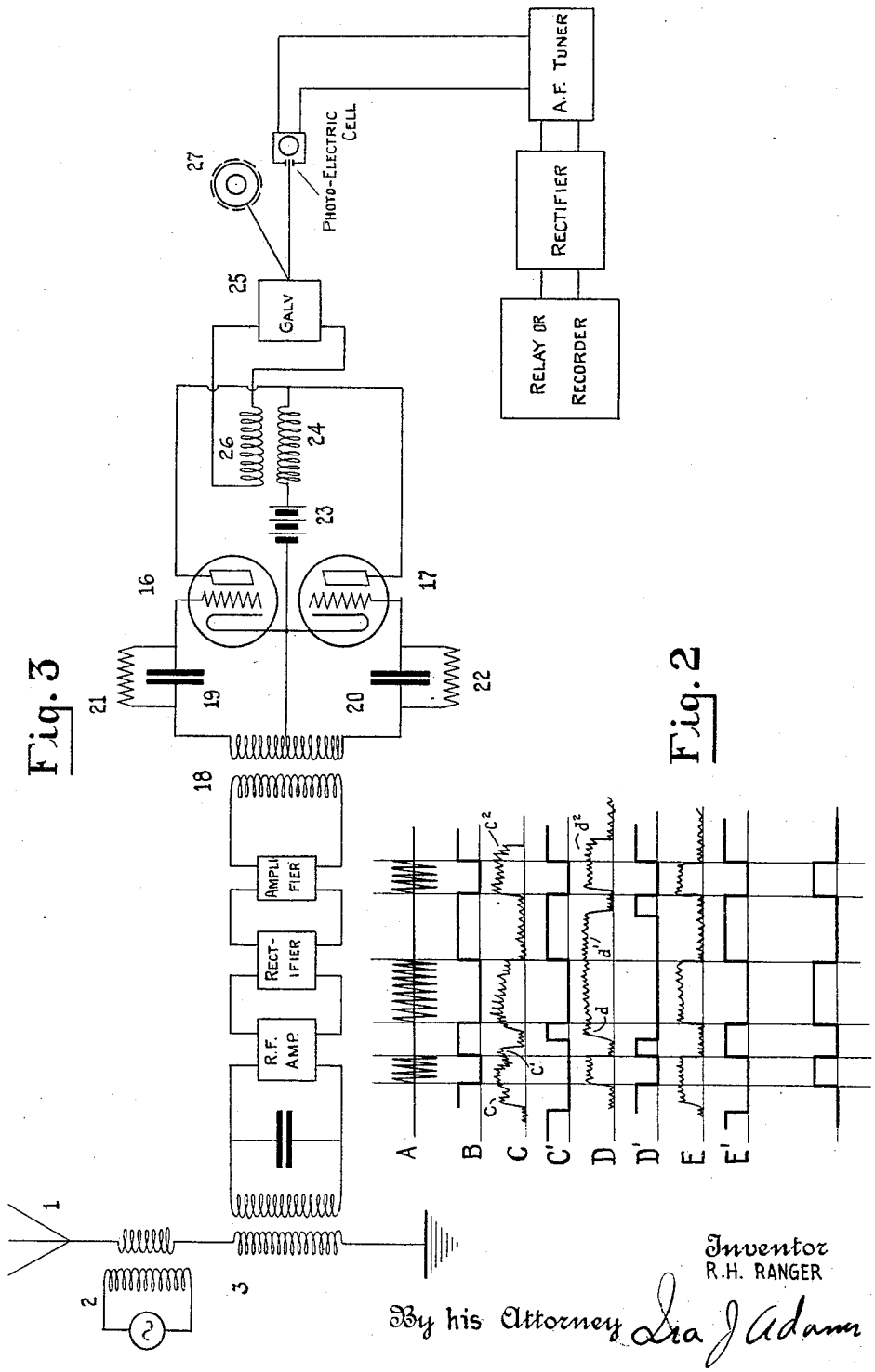
Inventor
R.H. RANGER
By his Attorney Ira J Adams Patented Dec. 24, 1929

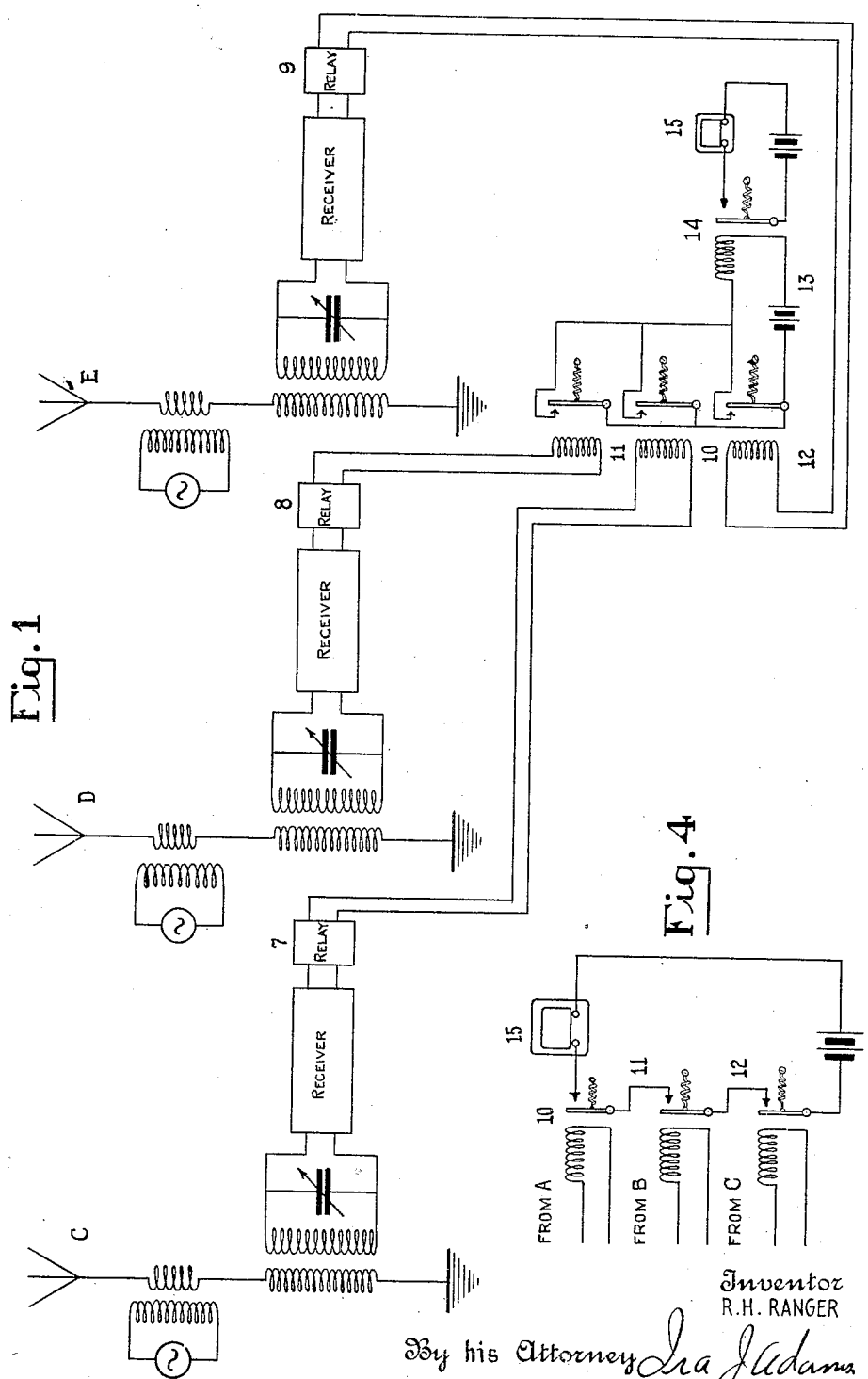

1,740,833

UNITED STATES PATENT OFFICE

RICHARD HOWLAND RANGER, OF BROOKLYN, NEW YORK, ASSIGNOR TO RADIO CORPORATION OF AMERICA, A CORPORATION OF DELAWARE

METHOD AND MEANS FOR COMPARING AND SELECTING RADIOSIGNALS

Application filed February 16, 1923. Serial No. 619,353.

This invention relates to means for improving the reception of radio signals, particularly at times when the reception is likely to be interrupted by local disturbances, such as atmospherics or static disturbances.

It has been found that atmospheric disturbances in general are local in character and if receiving stations are located at widely separated points, they are only rarely interrupted by static disturbances occurring at each station at substantially the same time. I have taken advantage of this to devise a system of receiving radio signals at a plurality of receiving stations which may be and preferably are widely separated from each other. In this system which is described and claimed in my copending application Serial No. 514,456 filed October 27, 1921 for methods and means of receiving signals I have provided an arrangement in which records of the signals from a plurality of stations are placed on a single sheet, preferably in juxtaposition. The operator in reading the signals will read the record from any one of the stations, at the same time comparing the record which he is reading with the record from the other stations recorded alongside. In case there is a discrepancy between the several records, the operator can generally determine by the indications of the separate stations what the transmitted signal actually was.

In the present invention I have provided a method and means for electrically comparing the signals received at a plurality of stations and indicating by means of a single indicator as a signal the result of signals received at a plurality of stations. It has been found that this invention provides a system which will permit of signals being received and an intelligible record thereof being obtained by utilizing a plurality of receiving stations, under conditions which would make the separate signals received at any one of the stations in the system very difficult, if not impossible, to read and this is done by providing that the signals from each station ultimately actuate a single indicating system which is provided with controlling means which are so arranged that the cooperation of all stations is required in such a manner that in general if the correct signal is obtained at any station the correct signal is selected and indicated. This may be done by providing relays at each receiving station which cause the operation of the common indicator at the signal recording station in such a manner that the indicator responds when any of the station relays have responded. However, I have found that benefits of this system may best be utilized by providing for reverse Morse signalling; or by reversing the relay contacts; that is to say, the relays at each station energize the line to the recording station during the spacing periods, instead of during the actual signalling periods. In connection with this reversed signalling I prefer to use a limiting cut-off in the receiving station such as described and claimed in my copending application Serial No. 619,359, filed February 16, 1923.

My invention is shown in the accompanying drawing in which

Fig. 1 shows the preferred form of my system,

Fig. 2 is a chart showing the cooperation of the various receiving stations in producing the resultant indication at the recording station, and Fig. 3 is a view of one form of apparatus constituting the limiting cut-off according to the above entitled application, and Fig. 4 is a modification of my relay arrangement.

My invention will best be understood both as to its underlying theory and its practical construction and operation by reference to the specification and the attached drawing but its scope will be particularly pointed out in the appended claims.

Referring to Fig. 3 showing one form of limiting cut-off which may be utilized in this system, there is provided a receiving antenna 1 grounded in the usual manner and provided with a heterodyne supplying such a frequency as will give a 3,000 cycle beat with the received signal. Coupled to this antenna by means of coil 3, I provide a resonant circuit the output of which is led to a radio frequency amplifier; the output from this amplifier is fed to a rectifier from which the rectified currents of super-audible frequency are again amplified and fed into a balanced rectifier which in itself is a device for reducing the effects of static. This arrangement which is more particularly described in my copending application Serial No. 581,350, filed August 12, 1922, comprises two three-electrode tubes having the grids connected to opposite ends of the secondary of transformer 18 through grid condensers 19 and 20 shunted by grid leaks 21, 22. The middle point of the secondary is connected to the cathode of the tubes and the plates are connected together and to the filament through the plate battery 23 and the coil 24. This arrangement serves substantially to balance the initial impulses, but received currents cumulatively decrease the output of both tubes, so that the large initial impulses of highly damped static are substantially balanced, as well as the small initial impulses of signals. The sustained impulses gradually increase the negative charge on each of the grids so that the resultant plate current decreases when a sustained alternating current is impressed on the grids, but a 6,000 cycle variation occurs in the plate current. This super-audible pulsation of 6,000 is impressed on a galvanometer 25 by means of a coupling coil 26 and in addition it is desirable to impress an audible frequency of 1,000 on the system preferably by means of a light placed to shine on the galvanometer mirror, which light is interrupted by any suitable means, such as a rotating shutter 27 at the desired frequency. The mirror of the galvanometer receives and reflects light on a photoelectric cell 28 when the deflection of the mirror is such that the light is reflected on the aperture of the cell. In this modification the galvanometer and the photo electric cell constitute the non-integrating limiting cut-off relay. The recording galvanometer of this type is particularly described in various patent applications of C. A. Hoxey, of which Serial No. 420,491, filed October 29, 1920, will serve as illustration. The current from the photo electric cell is led through a circuit tuned to 1,000 cycle variation, rectified and impressed on a suitable relay.

It will be apparent that when a transmitted wave is received the light will be deflected off the photo electric cell and the relays and all following circuits will thereupon be opened. I utilize this limiting cut-off in my system, as shown in Fig. 1, where I provide for example three receiving stations C, D and E each of which may be constructed as above described. The output current from each relay is respectively led to coils 10, 11 and 12 for controlling a plurality of relay contacts for the coil of relay 14. It will be apparent that whenever the circuits of coils of relays 10, 11 and 12 are open as when a signal is being received at all stations, the relay armatures will be pulled away from the contacts by the springs attached thereto and as a result the circuit from battery 13 through the coil of relay 14 will be opened thus allowing the spring attached to the armature of this relay to close it thereby closing a local circuit through indicator 15, which may be a recorder if desired.

Referring to Fig. 2 A shows the signals as transmitted. B shows the inverted signalling current which would be fed to coils 10, 11 and 12 if the operation of each station were not interfered with by static. C, D and E and C', D' and E' show rectified currents received at each station and the inverted currents of the three stations which are obtained by utilizing the limiting cut-off relay.

Each of these is mutilated at certain portions by heavy static so that none of the signals reads properly, the condition being aggravated for purpose of illustration. Station C has static so that the received signal might be read as dash, dash, space, dash; station D as dot, dash, dash; station E as dash, dash, space, dot. The limiting cut-off device of each receiver, however, does not pass current through the relays 7, 8, and 9 during the periods when signal currents are received and the mutilation in the inverted currents passing through the relays occurs only during the intermediate spacings. At the beginning of the signal relays 10, 11, and 12 are each supplied with current from relays 7, 8, 9 and as all three parallel relays are closed the battery circuit 13 is closed which causes the relay 14 to open the circuit of the indicator 15. During the space preceding the first dot, the relay 12 is opened when the static $e$ is received by station E. Relay 10 is also opened due to the static $c$, of station C, but the battery circuit remains closed by relay 11 as no static currents are received by station 8 during the period preceeding the first dot and the local indicator circuit therefore remains open and the preliminary space is recorded properly. During the first dot all of the relays are open due to the fact that the limiting cut-off relay operated by the signal current has deenergized the coils of relays 10, 11 and 12. At the end of the first dot the relays 11 and 12 will be closed as no signal is received at stations D or E and the indicator circuit will be opened at the end of the dot, in spite of the fact that the relay 10 has been opened due to static current $c'$ of station C.

Similarly the dash and the space will be correctly indicated by the indicator in spite of static $d$ and $d'$ of station D and the dot will be correctly indicated in spite of static $c^2$ and $d^2$ of stations C and D, because the indicator will only operate when all the relays 10, 11 and 12 are open simultaneously. If any portion of the message is received without interference at any one of the stations the resulting indication will be correct.

It will be apparent, however, that if desired I may provide the relay contacts 10, 11 and 12 in series directly in the local indicator circuit as shown in Fig. 4. The electrical selection of signals by this arrangement is the same as described above.

While I have shown and described this arrangement in particular for a system utilizing a reversal either of the signal or of the relay contacts at the receiving stations, that is for inverted signal current in relays 10, 11 and 12, it will be apparent that it is within the scope of my invention to utilize simply an ordinary relay at each receiving station without the limiting cut-off and provide at the recording station a series of relays connected in such manner that only the signals which are received simultaneously at all the receiving stations will actuate the local indicator.

Furthermore, while I have shown here the utilization of the principles of this invention by means of electro-magnetic relays, it will be obvious that I may use other types of relays such, for example, as thermionic tubes, as more particularly set forth and claimed specifically in my copending application Serial No. 609,376 filed December 28, 1922, for rectifier polarizer.

It is obvious that this invention is not limited to the precise arrangements shown and described, but modifications and changes may be made without departing from the scope of my invention, as pointed out in the appended claims.

Having described my invention, what I claim is:

1. In a radio receiving system, a plurality of geographically spaced antenna systems for receiving the same signals, means associated with each of said antenna systems for receiving and detecting the signals picked up by said antennas, a wire line associated with each of said receiving systems and leading therefrom to a common point, relays associated with each of said receiving systems for energizing the respective wire lines during the spacing periods in received signals, an indicator at the said common point arranged to produce indications only at periods when all of said transmission lines are deenergized.

2. In a radio receiving system, a plurality of geographically spaced antenna systems each arranged to receive the same radio signals, a receiving system associated with each of said antenna systems for detecting and receiving the signals picked up thereby, a line connecting each of said receiving systems to a common point, a relay system associated with each of said lines and arranged to energize the line only at periods when there is an absence of signals at the receiving station, an indicator, and means for causing the actuation of said indicator only at periods when all of said lines are deenergized.

3. In a radio receiving system for the reception of signals through atmospheric disturbances, the combination of a plurality of receiving systems so situated as to be exposed to substantially different fields of atmospheric disturbances, each receiving system comprising a relay having a normally energized output circuit and means controlled by received signals for deenergizing said output circuit in response to signals, an indicator and means cooperating with each of said normally energized relay circuits and with said indicator for actuating said indicator only when all of said output circuits are deenergized.

4. In a radio signalling system for receiving signals through atmospheric disturbances, the combination of a plurality of receiving systems exposed to substantially different fields of disturbances, and each comprising a relay having a normally energized output circuit and means for deenergizing said output circuit upon receipt of desired signals comprising a light sensitive cell, means cooperating with said cell for normally projecting light thereon when desired signals are not received and operative in response to desired signals to divert light therefrom, whereby said relay circuit is deenergized, an indicator, means cooperating with each of said relay circuits and with said indicator to actuate said indicator only when each of said relay circuits is deenergized.

5. In a radio signalling system for receiving signals through atmospheric disturbances, the combination of a plurality of receiving systems exposed to substantially different fields of atmospheric disturbance, and each comprising a relay normally having its output circuit energized when desired signals are not received and means for causing deenergization of said relay circuit on receipt of desired signals, comprising a light sensitive cell, means for normally projecting light thereon when desired signals are not received comprising a galvanometer and means for deflecting light therefrom when desired signals are received comprising means for energizing said galvanometer when desired signals are received, an indicator, and means cooperating with said indicator and with each of said relay circuits to energize said indicator only when all of said relay circuits are deenergized.

6. In a radio signalling system for receiving signals through atmospheric disturbances, the combination of a plurality of receiving systems so situated as to be exposed to atmospheric disturbances of substantially different character, and each of said systems comprising a relay having an output circuit normally energized when desired signals are not received, and means for deenergizing said relay circuit in response to receipt of desired signals, comprising a photo electric cell, means for normally projecting light thereupon when desired signals are not received, comprising a galvanometer, means for energizing said galvanometer to deflect light away therefrom comprising a circuit normally having a predetermined current flow therein, and means for decreasing current flow therethrough in response to desired signals, an indicator, and means cooperating with each of said relay circuits and with said indicator for causing energization thereof only when all of said relay circuits are deenergized.

RICHARD HOWLAND RANGER.